US009958850B2

(12) United States Patent
Bruneel et al.

(10) Patent No.: US 9,958,850 B2
(45) Date of Patent: May 1, 2018

(54) ENERGY MANAGEMENT SYSTEM (71) Applicant: Smappee NV, Kortrijk (BE)

(72) Inventors: Joost Bruneel, Gullegem (BE); Hans Delabie, Lauwe (BE)

(73) Assignee: Smappee NV, Kortrijk (BE)

( * ) Notice: Subject to any disclaimer, the term of this patent is extended or adjusted under 35 U.S.C. 154(b) by 166 days.

(21) Appl. No.: 14/434,724

(22) PCT Filed: Jun. 24, 2014

(86) PCT No.: PCT/EP2014/063304
§ 371 (c)(1),
(2) Date: Apr. 9, 2015

(87) PCT Pub. No.: WO2015/154824
PCT Pub. Date: Oct. 15, 2015

(65) Prior Publication Data
US 2016/0132032 A1 May 12, 2016

(30) Foreign Application Priority Data

Apr. 9, 2014 (WO) .................. PCT/EP2014/057217
Apr. 9, 2014 (WO) .................. PCT/EP2014/057218

(51) Int. Cl.
*G05B 19/048* (2006.01)
*H04Q 9/00* (2006.01)
*H02J 13/00* (2006.01)

(52) U.S. Cl.
CPC ........ *G05B 19/048* (2013.01); *H02J 13/0006* (2013.01); *H04Q 9/00* (2013.01); *G05B 2219/2639* (2013.01)

(58) Field of Classification Search
CPC ........... G05B 19/048; G05B 2219/2639; H02J 13/0006; H04Q 9/00
(Continued)

(56) References Cited

U.S. PATENT DOCUMENTS 4,858,141 A    8/1989 Hart et al.
9,369,782 B2 * 6/2016 Haghighat-Kashani . H04Q 9/00
(Continued)

FOREIGN PATENT DOCUMENTS

EP      2 528 033     11/2012
GB       2471536       1/2011
(Continued)

OTHER PUBLICATIONS http://en.wikipedia.org/wiki/Student's_t-test.
(Continued)

*Primary Examiner* — Robert Cassity
*Assistant Examiner* — Chad Erdman
(74) *Attorney, Agent, or Firm* — Levy & Grandinetti (57) ABSTRACT

An energy management system is disclosed having an in situ processing unit with a measuring unit capable of measuring a set of power related parameters over a main electricity cable. The system has a first processing unit capable of processing the power related parameters by applying a signature detection algorithm, for detecting an event relating to turning ON or OFF an electronic and/or electric appliance and for characterizing the event. The system also has means for transferring to a server a data packet having an output of said signature detection algorithm. The processing unit triggers the transfer of a data packet only in case such an event is detected. Also disclosed is a method for monitoring the use of electronic and/or electric appliances.

19 Claims, 4 Drawing Sheets

(58) Field of Classification Search
USPC .......................................................... 700/295
See application file for complete search history.

(56) References Cited

U.S. PATENT DOCUMENTS

| | | | |
|---|---|---|---|
| 2006/0280121 A1* | 12/2006 | Matoba | H04L 63/1458 370/235 |
| 2007/0118638 A1* | 5/2007 | Ban | G05B 23/0272 709/224 |
| 2010/0250161 A1 | 9/2010 | Wang et al. | |
| 2010/0280978 A1 | 11/2010 | Shimada et al. | |
| 2011/0313964 A1 | 12/2011 | Sanchey Loureda et al. | |
| 2012/0016608 A1 | 1/2012 | Ko et al. | |
| 2012/0072389 A1 | 3/2012 | Aldridge et al. | |
| 2012/0323510 A1 | 12/2012 | Bell et al. | |
| 2013/0159756 A1 | 6/2013 | Ellis | |
| 2013/0191103 A1* | 7/2013 | Chu | G06F 17/5036 703/14 |
| 2014/0248802 A1* | 9/2014 | Hieda | H04L 12/2818 439/620.01 |
| 2015/0119726 A1* | 4/2015 | Matsuno | A61B 5/0022 600/483 |
| 2016/0359325 A1* | 12/2016 | Kawata | H02J 3/14 |

FOREIGN PATENT DOCUMENTS

| | | |
|---|---|---|
| GB | 2488164 | 8/2012 |
| WO | WO 2007/139587 | 12/2007 |
| WO | WO 2011/002735 | 1/2011 |
| WO | WO 2012/106709 | 8/2012 |

OTHER PUBLICATIONS

Berges, Mario et al., "Learning Systems for Electric Consumption of Buildings," Proceedings of the 2009 ASCE International Workshop on Computing in Civil Engineering, Austin, Texas, pp. 1-10.

* cited by examiner

ENERGY MANAGEMENT SYSTEM

FIELD OF THE INVENTION

The present invention relates to an energy management system for monitoring electronic and/or electric appliances more efficiently by: measuring/monitoring power parameters over a main electricity cable, applying a signature detection algorithm on said power parameters and transferring a data packet comprising the output of said signature detection algorithm.

BACKGROUND OF THE INVENTION

Public awareness regarding low levels of natural resources is recently more aggressively introduced in our daily life. Since alternative resources cannot fully compensate the lack of natural resources, keeping consumption like electricity and gas to a minimum is becoming a necessity. As a consequence, low individual consumption and appliance efficiency are key.

Devices directed to measuring the consumption of the appliances within a house are known in the art, as for example the ones described in US20120016608 or GB2488164.

US20120016608 defines a device capable of measuring electrical parameters and detecting electrical features of appliances. The device compares the electrical features with appliance information recorded in a database of a local-end system. In case the appliance information is not matched, the local-end system transmits the electrical features to a server for a more complete comparison. Such a device requires a high computational power for processing the measured electrical parameters and therefore fails to offer an efficient solution with a low cost implementation.

GB2488164 defines a system capable of recognizing types and classes of appliances and their energy consumption from raw energy sensor data. The system comprises a sensing component where environmental sensing and data collection takes place and a server component which hosts the data computation and data analytics means. The collected data is processed through mathematical functions like: mean, standard deviation and root-mean-square and sent through a communication link to the server. Such a device uses a lower computational power but fails to offer a reliable and easy implementable solution since it requires a continuous open communication link between the sensing component and the server.

It is therefore an object of the present invention to provide an improved energy management system increasing the efficiency in monitoring the energy consumption while providing the ability of a consumer to follow-up the energy consumption characteristic in real-time from a remote location.

It is another object of the present invention to provide a real-time energy consumption follow-up while keeping low computational power on the sensor and/or avoiding extensive data streaming.

It is a further object of the present invention to provide an energy management system that outputs an accurate consumption characteristic and keeps, at the same time the overall manufacturing costs to a minimum.

It is a further object of the present invention to provide a device that enhances public awareness regarding energy consumption at a particular moment in time or within a defined time period. The device being able to output the electrical characteristics and consumption evolution of a plurality of appliances within the defined period of time and help the user identify appliances that are not functioning within the optimal consumption range anymore.

The present invention meets at least one of the above objectives by providing an energy management system and method as further described in the description of the invention.

SUMMARY OF THE INVENTION

The present invention is directed to an energy management system comprising an in situ processing unit comprising: (a) a measuring unit capable of measuring a set of power related parameters over a main electricity cable; (b) a first processing unit capable of processing said power related parameters by applying a signature detection algorithm, for detecting an event relating to turning ON or OFF of an electronic and/or electric appliance and for characterizing said event; (c) means for transferring to a server a data packet comprising an output of said signature detection algorithm, characterized in that, the processing unit triggers the transfer of a data packet only in case such an event is detected.

Preferably, the in situ processing unit comprises: (A) a measuring unit capable of measuring and monitoring a power related set of parameters, X, as a function of time, t, over a main electricity cable; (B) a first processing unit capable of processing said power related parameters by applying a signature detection algorithm comprising: (a) calculating a power value, $P_i$, from the values of the power related set of parameters, $X_i$, measured within a time interval, $\Delta_{ti}$, comprised between $[t_i, t_{i+1}]$; (b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}]$, wherein $t_j > t_i$; (c) comparing the value of the power variation, $\Delta P_i$, with a reference value, $\Delta P_{ref}$, and defining that an event occurred between times $t_i$ and $t_{j+1}$ in case $\Delta P_i > \Delta P_{ref}$, else the power set of parameters, $X_i$, is considered as steady between times ti and $t_{j+1}$; If and only if an event occurred between $t_i$ and $t_{j+1}$, then said processing unit further processes the data as follows: (a) defining an event interval $[t_{h,0}, t_{h,N+1}]$ with $t_{h,0} < t_i < t_{j+1} < t_{h,N+1}$, comprising a pre-event interval $\Delta t_{h,0} = [t_{h,0}, t_{h,1}]$ and post-event interval $\Delta t_{h,N} = [t_{h,N}, t_{h,N+1}]$, such that the power set of parameters, $X_{h,0}$ and $X_{h,N}$ are steady in both pre-event interval and post-event interval, respectively; (b) calculating the power values, $P_{h,0}$ and $P_{h,N}$ within the respective time intervals, $\Delta t_{h,0}$ and $\Delta t_{h,N}$, and calculating the variation $\Delta P_{h,ON} = P_{h,N} - P_{h,0}$; (C) means for transferring a data packet comprising said variation, $\Delta P_{h,ON}$, to a server.

Preferably the power related set of parameters, X comprises data selected from any one or more of voltage, U, current, I, U, I phase difference, $\cos \varphi$.

Further, said power values Pi, Pj are in the form of an n-dimensional vector, where the n values in the vector model the power curve during one complete voltage cycle.

Preferably, the comparing the value of the power variation $\Delta P_i = P_j - P_i$ for defining whether an event occurred between times $t_j$ and $t_{j+1}$ is determined by a T test, $T(\Delta t_i, \Delta t_j)$, defined as the difference between the arithmetic means $\overline{P_{\Delta t_i}}, \overline{P_{\Delta t_j}}$ of power values measured at different times in the intervals $\Delta t_i$ and $\Delta t_j$, respectively, divided by the square root of the sum of the variances of said power values, divided by the total number, n, of power values measured in both intervals $\Delta t_i$ and $\Delta t_j$:

$$T(\Delta t_i, \Delta t_j) = \frac{\overline{P_{\Delta t_i}} - \overline{P_{\Delta t_j}}}{\sqrt{\frac{\sigma^2_{\Delta t_i} + \sigma^2_{\Delta t_j}}{n}}}.$$

Preferably the time intervals $\Delta t_i$ and $\Delta t_j$ are consecutive, i.e., $t_{i+1}=t_j$.

Preferably, the event interval $[t_{h,0}, t_{h,N+1}]$ is divided into N+2 consecutive event subintervals: $\Delta t_{h,0}, \Delta t_{h,1}, \ldots, \Delta t_{h,1}, \Delta t_{h,i+1}, \ldots, \Delta t_{h,N}, \Delta t_{h,N+1}$, of equal time duration.

Preferably, the system comprises a server, said server further comprising a communication interface for receiving data packets transferred by the in situ processing unit.

Preferably, the server further comprises a second processing unit capable of assigning a specific electronic and/or electric appliance to each data packet received from the in situ processing unit as a function of various characteristic parameters of each of said data packets such as: $\Delta P_{h,ON}$, $P_{peak}$, $\Delta t_{peak}$.

Preferably the output of said signature detection algorithm comprises a number string representing peak parameters such as the amplitude of the peak, $P_{peak}$, and/or duration of the peak, $\Delta t_{peak}$ and/or the output of the comparison (defined as the transient characteristic).

Preferably said second processing unit further comprises means for classifying different data packets having similar characteristic parameters into a duster and preferably means for sending said cluster to said first processing unit of the in situ processing unit.

Preferably said power related set of parameters, X, are measured/monitored at a sampling rate comprised between 1-16 kHz.

Preferably said event is detected whenever the absolute T-test value of at least 35 is detected.

Preferably, the event signature comprises an 120 number string.

Preferably said server further performs an analysis of energy consumption over time The present invention is further directed to a method for monitoring the use of electronic and/or electric appliances comprising the following steps: measuring/monitoring power related parameters over a main electricity cable, said measuring/monitoring being performed by a measuring unit part of an energy management system according to the present invention, processing said power related parameters on said first processing unit, by applying a signature detection algorithm for detecting whether an event relating to turning ON or OFF an electronic and/or electric appliance occurred and for characterizing said event, initiating a data transfer to a server, transferring to a server a data packet comprising an output of said signature detection algorithm, characterized in that said method further comprises triggering the transfer of a data packet only in case such an event is detected.

In a further embodiment, said the in situ processing unit performs at least the following steps:

(A) Measuring and monitoring power related set of parameters, X, as a function of time, t, over a main electricity cable through a measuring unit;

(B) Processing said power related parameters by applying a signature detection algorithm on a processing unit, by at least: (a) calculating a power value, $P_i$, from the values of the power related set of parameters, $X_i$, measured within a time interval, $\Delta t_i$ comprised between $[t_i, t_{i+1}]$; (b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}]tj$, wherein $t_j > t_i$; (c) comparing the value of the power variation, $\Delta P_i$, with a reference value, $\Delta P_{ref}$, and defining that an event occurred between times $t_i$ and $t_{j+1}$ in case $\Delta P_i > \Delta P_{ref}$, else the power set of parameters, $X_i$, is considered as steady between times $t_i$ and $t_{j+1}$; If and only if an event occurred between $t_i$ and $t_{j+1}$, then said processing unit further processes the data as follows: (d) defining an event interval $[t_{h,0}, t_{h,N+1}]$ with $<t_{h,0}<t_i<t_{j+1}<t_{h,N+1}$, comprising a pre-event interval $\Delta t_{h,0} = [t_{h,0}, t_{h,N+1}]$ and post-event interval $\Delta t_{h,N} = [t_{h,N}, t_{h,N+1}]$, such that the power set of parameters, $X_{h,0}$ and $X_{h,N}$ are steady in both pre-event interval and post-event interval, respectively: (e) calculating the power values, $P_{h,0}$ and $P_{h,N}$ within the respective time intervals, $\Delta t_{h,0}$ and $\Delta t_{h,N}$, and calculating the variation $\Delta P_{h,ON} = P_{h,N} - P_{h,0}$;

(C) Transferring a data packet comprising said variation, $\Delta P_{h,ON}$, to a server.

Preferably said server further comprises a second processing unit capable of performing the step of assigning a specific electronic and/or electric appliance to each data packet received from the in situ processing unit, as a function of various characteristic parameters of each of said data packets such as: $\Delta P_{h,ON}$, $P_{peak}$, $\Delta t_{peak}$.

Preferably the output of said signature detection algorithm comprises a number string representing peak parameters such as the amplitude of the peak, $P_{peak}$, and/or duration of the peak, $\Delta t_{peak}$ and/or the output of the comparison (defined as the transient characteristic).

Further, said second processing unit further comprises a step of classifying different data packets having similar characteristic parameters into a cluster and preferably a step of sending said cluster to said first processing unit of the in situ processing unit.

The present invention is further directed to a kit of parts comprising an in situ processing unit as defined in the present invention and a server as defined in the present invention.

In a further embodiment according to the present invention, the kit of parts comprises a in situ processing unit comprising: a measuring unit comprising a sensor suitable for measuring power parameters over a main electricity cable, said sensor being adapted to be clamped around said electricity cable, a main board comprising a processor unit in communication with said sensor and capable of receiving data from said sensor, said main board further comprising a wireless interface for communicating with said server, a controller unit for controlling the start and end transmission of processed power data over the wireless interface In a further embodiment according to the present invention, the kit of parts comprises a in situ processing unit comprising: a sensor suitable for measuring power parameters over a main electricity cable, said sensor being adapted to be clamped around said electricity cable, a sensor suitable for measuring power parameters on a second main electricity cable, said sensor being adapted to be clamped around a power cable, a main board comprising a processor unit and a wireless interface, said main board receiving data from said sensors. Preferably, said second main electricity cable is used for transporting energy from solar panels.

DESCRIPTION OF THE INVENTION

The present invention (FIG. 1) is directed towards an energy management system comprising an in situ processing unit (1) comprising: (a) a measuring unit (2, 3, 5) capable of measuring a set of power related parameters over a main electricity cable; (b) a first processing unit (6) capable of processing said power related parameters by applying a signature detection algorithm, for detecting an event relating to turning ON or OFF of an electronic and/or electric appliance and for characterizing said event; (c) means for transferring to a server a data packet comprising an output of said signature detection algorithm. In order to optimize the volume of data transmission between the in situ processing unit (1) and the server (4), the processing unit triggers the transfer of a data packet only in case such an event is detected.

Figure 1:
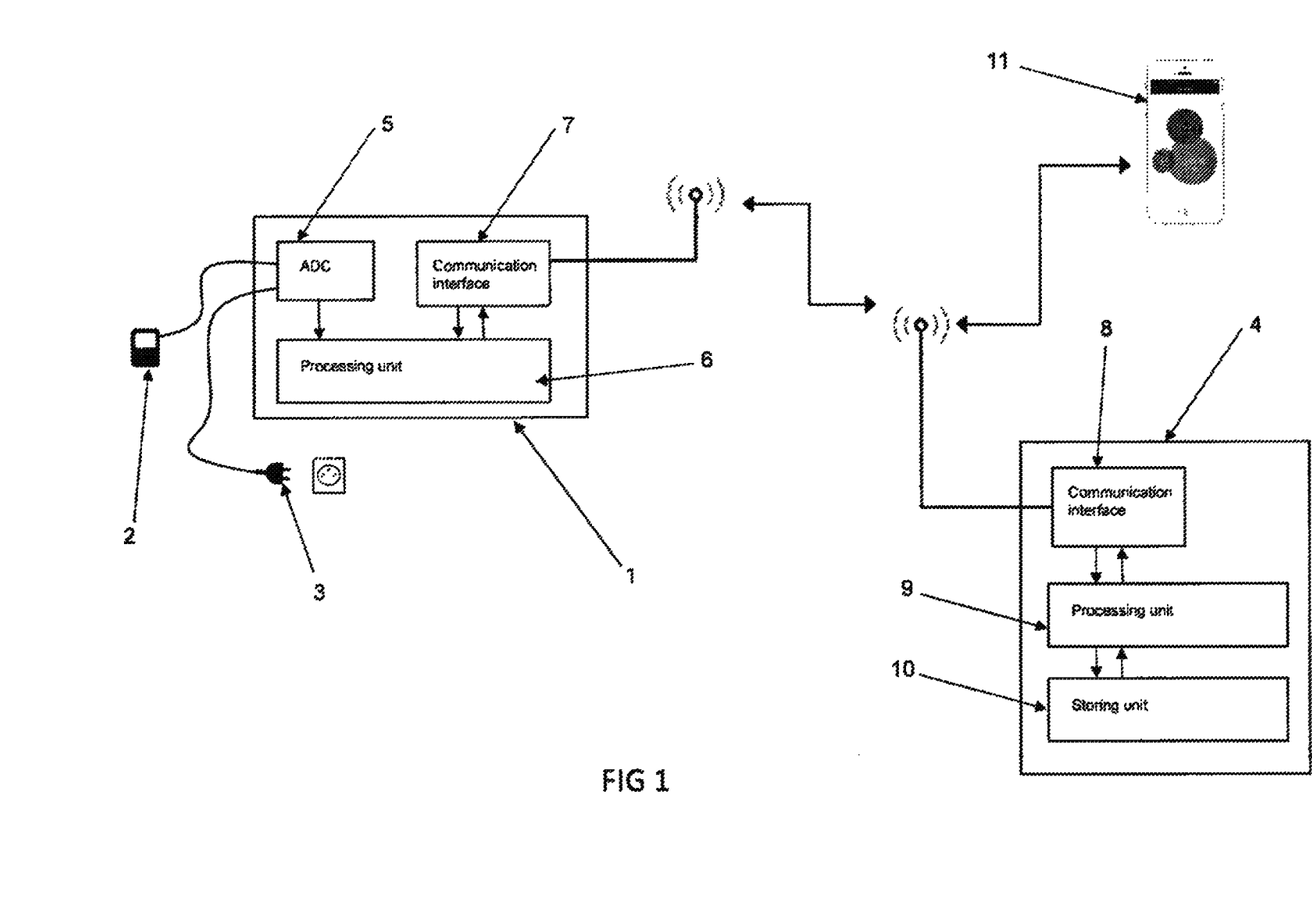
FIG. 1 schematically represents a system according to the present invention

The measuring unit (2, 3, 5) is capable of measuring/monitoring power parameters over a main electricity cable through a sensor (2) placed on the main electricity cable and directly connected to a main housing. Preferably such a sensor (2) is clamped around the main electricity cable and continuously measures/monitors the power parameters over such cable. It is however to be understood that such a sensor (2) can also be mounted in direct physical contact with the electricity cable. The main housing hosts a main electronic board comprising means for processing said measured power related parameters by applying a signature detection algorithm and means for transferring a data packet comprising the output of said signature detection algorithm.

Preferably, the main housing comprises a cable connectable to a conventional electricity socket (3).

In the context of the present invention a main electricity cable is to be understood as a cable supplying with electrical energy a multitude of appliances such as the electricity cable transporting energy from a main power line to a building, or a house or an apartment.

In the context of the present invention the signature is to be understood as a collection of power parameters over a limited period of time and represents a change in energy consumption typical to an appliance or a combination of appliances. Such a typical change may be a peak and/or transient changes after the peak and/or typical energy consumption characteristic before and/or after and/or during the peak, or combinations thereof. The change in energy consumption can be determined through a change of power parameters such as: current, voltage, cos (p (where q is the phase angle between the current and the voltage), real power, reactive power, a normalized real/reactive power, or the like.

Preferably the in situ processing unit (1) comprises a sensor (2) which is mounted on the main electricity cable at the entrance of a house or an apartment or a building, immediately after the cable enters inside the house or apartment or building, between the electricity meter and the fuse box.

Because the transfer of data to the server (4) is initiated upon signature detection, the efficiency of the system according to the present invention is significantly improved, since only the amount of data necessary for further analysis and processing is sent to the server (4) and not a continuous stream of values. Further, in case there is no detected change in the power parameters and therefore in the energy consumption of the house, the in situ processing unit (1) will not initiate a communication link with said server (4). Such a characteristic makes the system according to the present invention energy efficient, since it only uses minimum resources and provides at the same time an accurate and complete set of data.

Conventional distribution systems of electricity used inside conventional residences like houses or apartments are single phase distribution systems. It is to be understood that a system according to the present invention can also be used in dual phase or three phase distribution systems. In case a single phase distribution system is used, the in situ processing unit (1) uses one sensor (2) clamped around the electricity cable.

In case a dual phase or three phase distribution system is used, the system according to the present invention will preferably use a sensor (2) for each phase and clamped around each electricity cable such as two sensors (2) for the dual phase distribution (FIG. 2) and three sensors (2) for the three phase distribution system.

In an embodiment according to the present invention, the in situ processing unit (1) comprises an Analog to Digital Convertor (ADC) (5) receiving raw data from the sensor (2) and converting said data. Such an ADC (5) has a resolution between 6 and 24 bits, preferably between 12 and 24, even more preferably the ADC (5) has a resolution of 24 bits.

The samples from the ADC (5) are preferably sent to a first processing unit (6), at the level of the in situ processing unit (1) and used for applying an event detection algorithm and/or a signature detection function as will be further explained.

Figure 3:
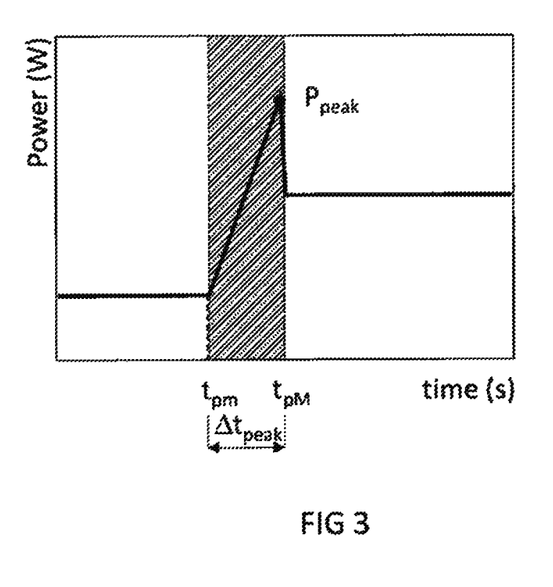
FIG. 3 represents a power peak characterizing an event relating turning ON an electronic and/or electric device FIG. 4 schematically illustrates an event detection algorithm according to the present invention

It is commonly found that immediately after an electronic and/or electric appliance is turned ON, a temporary high energy request is measured, which will be further referred to as a "peak" and further considered as a positive peak. After a short amount of time the energy consumption drops and moves to a steady relatively constant characteristic. Such a positive peak is defined by the maximum amplitude of the measured signal ($P_{peak}$) and duration, $\Delta t_{peak}$ from the starting point of the high energy consumption $t_{pm}$ until the steady consumption is reached, $t_{pM}$, wherein $\Delta t_{peak}$ is $t_{pM} - t_{pm}$ (FIG. 3).

It is further considered in the present invention that when certain appliances are turned OFF, a temporary low energy request is measured, which will be further referred to as a "peak" and further considered as a negative peak. After a short amount of time the energy consumption rises and moves to a steady relatively constant characteristic. Such a negative peak is defined by a minimum amplitude of the measured signal and the duration ($\Delta t_{peak}$) from the starting point of the low energy consumption until the steady consumption is reached.

For determining the appearance of a positive/negative peak and ultimately the appearance of an event, the system according to the present invention performs a mathematical analysis on the samples received from the ADC (5).

In the context of the present invention an event is to be understood as turning ON or OFF an electronic and/or electric appliance.

Figure 4:
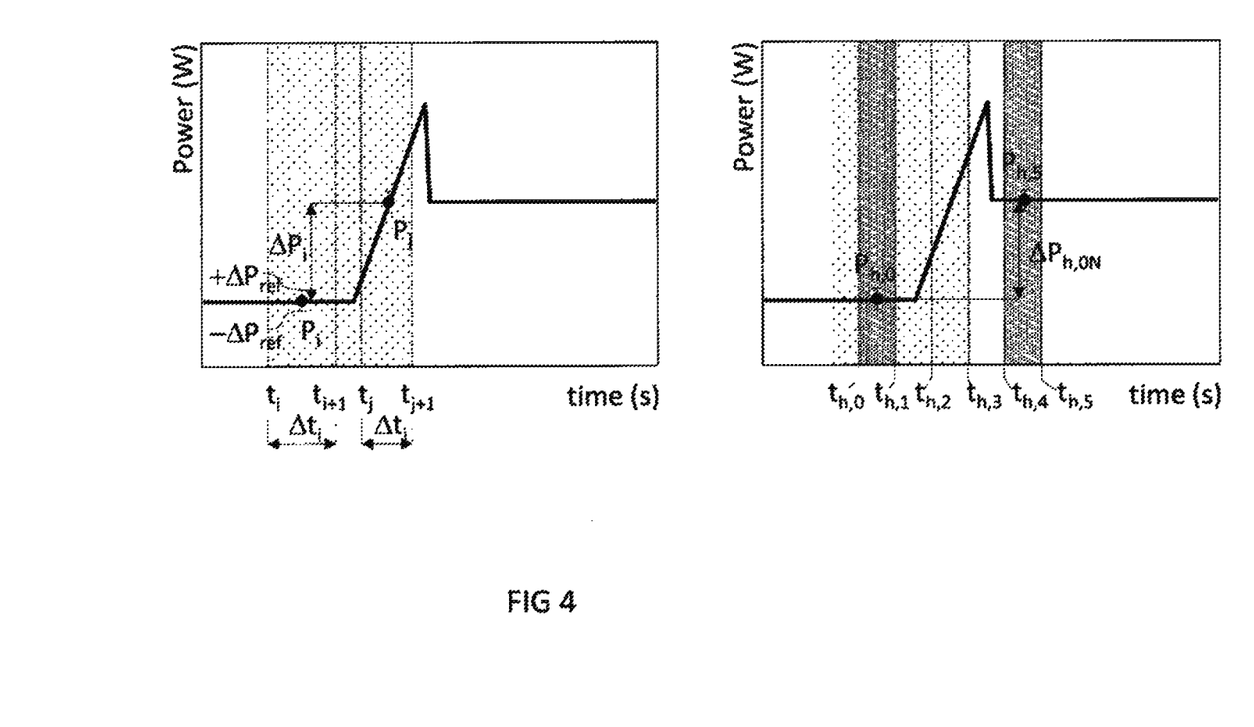

In a preferred embodiment according to the present invention and as illustrated in FIG. 4, said in situ processing unit (1) comprises: (A) a measuring unit (2, 3, 5) capable of measuring and monitoring a power related set of parameters, X, as a function of time, t, over a main electricity cable; (B) a first processing unit (6) capable of processing said power parameters by applying a signature detection algorithm comprising: (a) Calculating a power value, $P_i$, from the values of the power related set of parameters, $X_i$, measured within a time interval, $\Delta_{ti}$ comprised between $[t_i, t_{i+1}]$; (b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}] t_j$, wherein $t_j > t_i$; (c) comparing the value of the power variation, $\Delta P_i$, with a reference value, $\Delta P_{ref}$, and defining that an event occurred between times $t_i$ and $t_{j+1}$ in case $\Delta P_i > \Delta P_{ref}$ else the power set of parameters, $X_i$, is considered as steady between times $t_i$ and $t_{j+1}$. In a further step if and only if an event occurred between $t_i$ and $t_{j+1}$, then said processing unit further processes the data as follows: (a) defining an event interval $[t_{h,0}, t_{h,N+1}]$ with $t_{h,0} < t_i < t_{j+1} < t_{h,N+1}$, comprising a pre-event interval $\Delta t_{h,0} = [t_{h,0}, t_{h,1}]$ and post-event interval $\Delta t_{h,N} = [t_{h,N}, t_{h,N+1}]$, such that the power set of parameters. $X_{h,0}$ and $X_{h,N}$ are steady in both pre-event interval and post-event interval, respectively; (b) calculating the power values. $P_{h,0}$ and $P_{h,N}$ within the respective time intervals, $\Delta t_{h,0}$ and $\Delta t_{h,N}$, and calculating the variation $\Delta P_{h,0N} = P_{h,N} - P_{h,0}$; (C) means for transferring said variation, $\Delta P_{h,0N}$, to a server (4).

Preferably, the server (4) is placed at a different location than the in situ processing unit (1) and comprises at least means for receiving data packets transferred by the in situ processing unit (4), through a communication interface (8). Such data packets further comprising the output of said signature detection algorithm.

Preferably, the system according to the present invention applies in real time or immediately after retrieving the samples a two window algorithm as follows: the stream of samples received from the ADC (5) is split into consecutive windows of 4 seconds, preferably 3 seconds, even more preferably of 2 seconds. For identifying the appearance of a peak and therefore the appearance of an event, two consecutive windows are being analyzed by applying a statistical T test to the samples comprised within the two windows, cf. e.g., http://en.wikipedia.org/wiki/Student%27s_t-test.

Preferably, for determining the result of the T test, an average value of the samples within two windows is further calculated: $\Delta t_i$ calculated with samples comprised between $[t_i, t_{i+1}]$ and $\Delta t_j$ calculated with samples comprised between $[t_j, t_{j+1}]$. In a further step, the value of the power variation $\Delta P_i = P_j - P_i$ for defining whether an event occurred between times $t_i$ and $t_{j+1}$ is determined by a T test, $T(\Delta t_i, \Delta t_j)$, defined as the difference between the arithmetic means, $\overline{P_{\Delta t_i}}, \overline{P_{\Delta t_j}}$, of power values measured at different times in the intervals $\Delta t_i$ and $\Delta t_i$, respectively, divided by the square root of the sum of the variances of said power values, divided by the total number, n, of power values measured in both intervals $\Delta t_i$ and $\Delta t_j$. The result of the above steps will be further referred to as the value of the T test:

$$T(\Delta t_i, \Delta t_j) = \frac{\overline{P_{\Delta t_i}} - \overline{P_{\Delta t_j}}}{\sqrt{\frac{\sigma^2_{\Delta t_i} + \sigma^2_{\Delta t_j}}{n}}}$$

Where $$\sigma = \sqrt{\frac{1}{n}\sum_{i=1}^{n}(x_i - \overline{x})^2}$$

and n is the number of samples considered in the intervals $[t_i, t_{i+1}]$, respectively $[t_j, t_{j+1}]$.

In order to determine if an event took place, the absolute value of the T-test is analyzed as follows if the absolute value is higher than 20, higher than 30, preferably higher than 40, even more preferably higher than 35 the system detects an event.

If the absolute value is not identified as being higher than 20, higher than 30, preferably higher than 40, even more preferably higher than 35, the system continues the analysis within the next two consecutive windows. If the system detects an event, the system further analyses if the event is a turn ON or OFF of an appliance.

Preferably, the system continues to apply said T-test until a steady characteristic is detected and further stores the duration of the positive/negative peak ($\Delta t_{peak}$) and the minimum/maximum amplitude of the peak ($P_{peak}$) (FIG. 3) within a storing unit, part of the in situ processing unit (1). It is to be understood that a peak comprises the data packet starting with the first sample detected as being significantly higher/lower than the previous sample until the system detects the starting of the steady characteristic.

In a preferred embodiment according to the present invention, the system detect a steady characteristic if the absolute value of the T-test is lower than 30, lower than 20, preferably lower than 10, even more preferably if said absolute value of the T-test is lower than 15.

Preferably the power values $P_i$, $P_j$ are in the form of an n-dimensional vector, where the n values in the vector model the power curve during one complete voltage cycle.

In a preferred embodiment according to the present invention the power related set of parameters, X comprises data selected from any one or more of: voltage, U, current, I, U, I phase difference, cos φ.

Preferably, for implementing an efficient and fast system, the time intervals $\Delta t_i$ and $\Delta t_j$ are consecutive, i.e., $t_{i+1} = t_j$.

In a further embodiment according to the present invention the event interval $[t_{h,0}, t_{h,N+1}]$ is divided into N+2 event subintervals: $\Delta t_{h,0}, \Delta t_{h,1}, \ldots, \Delta t_{h,i}, \Delta t_{h,j+1}, \ldots, \Delta t_{h,N}, \Delta t_{h,N+1}$, of equal time duration.

In another embodiment according to the present invention said event is detected through a sliding window technique. For applying such a technique, the samples received from the sensor (2) during a limited amount of time (also called "window") are being analyzed by the first processing unit (6) on the in situ processing unit (1) by comparing each sample with the threshold value. In case one of the samples is above or equal to the threshold value, the system identifies a peak and therefore the start of an event. By using a sliding window technique, information regarding the power characteristic before the peak and after the peak is available without the need to temporarily store a large amount of data. After the system completes the analysis of a window, only the relevant information is sent to the server (4) and the rest of the data is being deleted from the system.

In a further embodiment, a data packet immediately before the peak and/or immediately after the peak is being analyzed by applying a mathematical function selected from a group comprising: FFT (Fast Fourier Transform), STFT (Short-Time Fourier Transform), DFT (Discrete Fourier Transform), FRFT (Fractional Fourier Transform), averaging, convergent series, asymptotic series, or a combination thereof. Preferably such a mathematical function is applied over two 4 second widows, preferably over two 3 second windows, even more preferably over two 2 second windows selected before and/or after the peak. By applying said mathematical function, the system according to the present invention determines the steady characteristic of the energy consumption before and/or after the peak.

In another embodiment according to the present invention, the event detection algorithm applies a statistical T-test over two windows as previously described in the present paper. Accordingly, such a statistical T-test algorithm identifies the turn ON/OFF of an appliance and/or the steady characteristic before and/or after and/or during the functioning of the appliance.

In an embodiment according to the present invention, if the system detects the turn ON of an appliance, the in situ processing unit (1) sends to the server (4) a data packet comprising peak data (such as maximum amplitude of the peak, $P_{peak}$, and/or duration of the positive peak, $\Delta t_{peak}$) (FIG. 3) and/or data relating to the steady characteristic before and/or after the positive peak.

If the system detect the turn OFF of an appliance, the in situ processing unit (1) sends to the server (4) a data packet comprising peak data (such as minimum amplitude, $P_{peak}$, and/or duration of the negative peak, $\Delta t_{peak}$) and/or data relating to the steady characteristic before and/or after the end of said event through a communication interface (7).

In an embodiment according to the present invention, the output of the signature detection algorithm and therefore the data packet sent to the server (4) comprises: positive/negative peak parameters and/or power parameters after said positive/negative peak. Preferably such data packet will be further referred to as the event signature.

In a preferred embodiment according to the present invention said signature detection algorithm further comprises event detection through a two window algorithm.

In another embodiment according to the present invention, the first processing unit (6) found on the in situ processing unit (1) further performs a comparison of the results from the mathematical processing of the two windows (before and after the positive/negative peak) by applying a mathematical function. Such a mathematical function is selected from a group comprising: division, subtraction, or the like. Preferably, the output of said comparison defines the transient characteristics of the energy consumption. In a preferred embodiment according to the present invention, said transient characteristic is in the form of: a 100 number string, or a 20 number string, or 30 number string, or a 40 number string, or a 60 number string, or a 70 number string, or a 83 number string, preferably the result of the comparison is an 80 number string.

Preferably, the output of said signature detection algorithm comprises a number string representing peak parameters such as the amplitude of the peak, $P_{peak}$, $\Delta P_{h,ON}$, and/or duration of the peak, $\Delta t_{peak}$, and/or the output of the comparison (defined as the transient characteristic).

Preferably said mathematical function for defining said transient characteristic is applied on the samples comprised within two 2 second windows before and after the positive/negative peak. The system further stores said transient characteristic and/or the transient time interval.

In a further embodiment according to the present invention, the transient characteristic and the positive/negative peak characteristic define the event signature. Preferably, the data packet sent by said in situ processing unit (1) to the server (4) comprises the event signature.

Preferably the data packet sent by said in situ processing unit (1) to the server (4) comprises a 40 number string, or a 60 number string, or a 80 number string, or a 100 number string, preferably the data packet comprises a 120 number string.

In a preferred embodiment the in situ processing unit (1) further comprises a wireless communication interface (7) for sending the data to the server (4) or said in situ processing unit (1) comprises means of sending data to the server (4) through a wired connection. Such a wireless communication interface can be a network card, a Bluetooth interface, an Infrared (IR) interface, or the like.

Preferably the server (4) further comprises a second processing unit (9) and a storing unit (10). The second processing unit (9) comprises means for applying different mathematical functions using the received event signature(s), such as an electronic and/or electric appliance detection function. Preferably said second processing unit (9) is capable of assigning a specific electronic and/or electric appliance to each data packet received from the in situ processing unit (1) as a function of various characteristic parameters of each of said data packets such as: $\Delta P_{h,ON}$, $P_{peak}$, $\Delta t_{peak}$ The obtained results are further stored in said storing unit (10) of said server (4). Because part of the analysis is performed on the in situ processing unit (1), the server (4) capabilities are used at their maximum potential and only for a more complex analysis that requires more powerful computational characteristics.

Preferably, said second processing unit (9) comprises means for classifying different data packets having similar characteristic parameters into a cluster and preferably means for sending said cluster to said first processing unit (6) of the in situ processing unit (1)

In another embodiment according to the present invention, the mathematical functions enable the server (4) to find similar event signatures within the set of received event signatures due to: relatively the same amplitude of the positive/negative peak ($P_{peak}$), relatively the same duration of the positive/negative peak ($\Delta t_{peak}$), relatively the same transient characteristics, relatively the same steady characteristic after the positive/negative peak, or the like. After similar event signatures are found, these are further classified in clusters.

In a preferred embodiment according to the present invention the events within one cluster have a common string within the transient characteristic. It is further preferred that said server (4) uses such common string to define a cluster.

For determining if an event is part of an existing cluster the system preferably uses a comparison by applying a similarity function between the transient characteristic of the event and each existing cluster, preferably by using the formula presented below. Preferably said transient characteristic of an event and/or said clusters are in a form of a 100 samples long, or 60 samples long, or 70 samples, or 83 samples long, preferably 80 samples long dimensional vectors.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

Further, the system calculates the angular similarity, by applying the following formula:

$$\text{angular similarity} = 1 - \frac{2 * \cos^{-1}(\text{similarity})}{\pi}.$$

The system further identifies a match if the result of said angular similarity is 1, which is further translated by the system as a similar shape for the two waveforms corresponding to the event signal and waveform corresponding to said cluster. In still a further step, said system further applies a comparison function on the magnitude of the average power of said two waveforms. If the result of said comparison is positive, the system identifies a match. Preferably the system considers a tolerance for such a comparison between 5% and 30%, preferably of 20%, even more preferably of 10%. Further said tolerance can be dependent on the events power magnitude (e.g. use 15% on appliance events having a power draw less than or equal to 100 W, but use 5% as tolerance in case the appliance has a power over 1500 W).

In another embodiment according to the present invention the system uses a comparison as previously explained by using the center of the transient characteristic and/or the center of the existing clusters.

In another preferred embodiment according to the present invention an event is considered as part of the relative cluster by comparing the transient time and/or the min/max peak amplitude ($P_{peak}$).

In another embodiment according to the present invention if the system identifies 2 or more clusters within a tolerance of 30%, preferably of 20%, even more preferably of 10% by applying an analysis as previously described, said system chooses the cluster with the highest similarity.

In a preferred embodiment according to the present invention, for a faster analysis of the events, said second processing unit (9), part of the server (4) further comprises means of sending said common string of each cluster back to the first processing unit (6) of the in situ processing unit (1). Further, said in situ processing unit (1) stores said common strings on a storing unit. Such a storing unit is selected from a group comprising: Flash memory, ROM, EPROM, EEPROM, DRAM, SRAM or any combination thereof.

In a preferred embodiment according to the present invention the server (4) performs a periodical analysis of existing signatures in order to eliminate duplicate signatures due to relatively small differences encountered within an extensive time of functioning. Preferably, the result of such an analysis is further used for updating the existing clusters. Further such an update is preferably sent to the in situ processing unit (1) and stored thereon.

In a further embodiment according to the present invention, after determining the event signature, the in situ processing unit (1) compares such event signature with the stored clusters and if such a cluster is identified, the data packet sent to the server (4) contains the event signature and the identified cluster. In case a cluster is not identified, the data packet sent to the sever comprises the event signature. A further cluster analysis is performed by said server (4).

In a preferred embodiment according to the present invention, the communication between the server (4) and the in situ processing unit (1) is done wirelessly.

In another embodiment according to the present invention, the clusters are further used by the server (4) to define the singular load components that define electronic and/or electric appliances.

In another embodiment according to the present invention, after an event is detected by the signature detection algorithm, the communication link with said server (4) is established and said in situ processing unit (1) initiates the data transfer to the server (4).

In another embodiment according to the present invention the sampling rate applied on the in situ processing unit (1) for measuring/monitoring power related parameters, X, is chosen between 1-16 kHz, preferably between 1-10 kHz, even more preferably between 3-5 kHz.

Commonly, the frequency of the electrical signal measured on an electricity cable is of 50 Hz or 60 Hz depending on the country and adopted standards, and choosing a sampling rate between 1-16 kHz ensures that the amount of data sent to the server (4) is not extensive, keeping to a minimum the technical requirements of both: in situ processing unit (1) and server (4). At the same time, such sampling rate assures that the amount of data sent to said server (4) provides enough information for performing an accurate analysis of the power parameters.

In a further embodiment according to the present invention, the sampling rate is chosen between 3-5 kHz. Such values eliminate the risk of thermal noise to alter the power data and allow a much faster and more accurate analysis on the in situ processing unit (1).

In a further embodiment according to the present invention the server (4) further comprises means for storing the event signatures over a period of time like for example over a week, a month, a year, or the like. Further, the server (4) performs a graph of the energy consumption based on said event signatures, facilitating a very accurate analysis of the energy consumption within the house, or apartment, or building, over a period of time.

In another embodiment according to the present invention, the server (4) further measures an "always on" energy consumption corresponding to appliances that are plugged in and functioning for an extensive period of time and further stores such a measurement.

In another embodiment, said "always on" energy consumption comprises power data relating to "no load" energy consumption such as: the consumption when a appliance is turned OFF but the system detects a relatively small consumption because the appliance remains plugged in. In a further embodiment according to the present invention the server (4) is a cloud server (4). Preferably such a server (4) receives event signatures from at least one location like a house or apartment. Even more preferably the server (4) receives event signatures from multiple locations and performs an accurate analysis of the energy consumption over a period of time for each location.

In a further embodiment, a user of the system according to the present invention creates an account on said server (4) by inputting a username and a password. Such a user further links the in situ processing unit (1) mounted at the entrance of his/her house or apartment to the account created on said server (4).

Preferably the user allows the in situ processing unit (1) to gather data for a particular period of time and accesses his/her account on the server (4) to retrieve a consumption graph relative to a selected period of time. Upon request, the server (4) provides data relating to: the moment of the day or the hour when the event started and/or the power characteristic during the event and/or the moment of the day or the hour when the event ended. Based on the received data, the user names the electrical appliances, such as: a lightning device, a fridge, a computer, a washing machine, a charger or the like. After the user names the appliances, the information is further stored on the server (4) against the event signature cluster. Therefore, when an event signature corresponding to a previously named appliance is detected by the server (4), such a server (4) will directly indicate the appliance name. Preferably, the system according to the present invention is continuously learning the appliances within the house or apartment. In case a new event signature cluster is detected, the server (4) provides to the user the data relating to: the moment of the day or the hour when the event started and/or the power characteristic during the event and/or the moment of the day or the hour when the event ended, helping therefore the user to identify and name the appliance. For an accurate overview of the consumption and an accurate detection of the appliances, the user preferably performs such an analysis every day, or every week, or every two weeks, or every month.

In another embodiment the system according to the present invention learns the appliances within the house in an assisted manner as follows. The user mounts the in situ processing unit (1) according to the present invention and tunes ON/OFF each appliance within his house. Preferably the user turns ON/OFF each appliance within his house twice for a more accurate analysis. Further, the system according to the present invention determines the signatures of each appliance within the house and the user can further easily name each appliance accordingly. In yet another embodiment according to the present invention, the server (4) comprises an appliance database comprising consumption data relating to appliances commonly used within a house. Furthermore, said appliance detection is automatically performed by comparison with such database, In a preferred embodiment according to the present invention when the user turns ON/OFF an electronic and/or electric appliance within his/her house, such an event will be visible on his/her account after less than 20 seconds, or after less than 10 seconds, preferably after less than 5 seconds, even more preferably the change will be visible in real time. In a further embodiment according to the present invention, the user can login on his account and query the server (4) for a complete analysis over a period of time such as: the complete consumption over a day, or a week, or a month, or a couple of months. The server (4) can output such an analysis through a graph or a succession of text lines and will provide to the user details relating to the moment when an appliance was turned ON and/or OFF, the consumption characteristics of that particular appliance while it was functioning. Further, the server (4) can output a general analysis of the energy consumption during certain hours and the appliances that were responsible for such a energy consumption or, the server can output such a general analysis of the energy consumption within a day, a week, a month or a number of months.

In another embodiment according to the present invention, the user logs in on his/her account and queries the server (4) for a complete analysis over a period of time. Such an analysis provides a complete consumption characteristic relating to the appliances that have been used within such period of time such as: the moment in time when an appliance is turned ON/OFF and/or the consumption characteristics of each appliance during its functioning period and/or the consumption characteristic during a stand-by type of functioning (such as the situation in which a personal computer is left connected to the power source over night without receiving a command from a user).

In another embodiment according to the present invention a user is able to log in on his/her account from a remote location by using any type of device (11) having an active internet connection such as: a mobile phone, a tablet, a desktop computer, a laptop, or the like. Even if the user is not in close proximity of the device, he/she will be able to see in real-time what appliances are functioning at the location where the device is mounted and the consumption characteristic of such appliances.

In a further embodiment according to the present invention, said device can be connected to the main electricity cable and to the electricity cable transporting energy from the solar panels. Further, once said user logs in on his/her account, he/she will be able to access data relating to power from the solar panels, consumption characteristics and/or "always on" consumption characteristics.

In another embodiment according to the present invention, the device further comprises a RF (Radio Frequency) module, allowing the user to switch ON/OFF an appliance from a remote location.

In another embodiment according to the present invention, the server (4) creates a pattern of the power usage within the house or apartment where such device is mounted. The pattern is to be understood as an approximation for a future period of time and created based on past consumption characteristic and/or season and/or weather forecast and/or number of people leaving in the house or apartment. Further, such a pattern is created for approximating the consumption within the next day or the next week or the next month or for the next season or next year.

In a further embodiment, the user provides data relating to the price of the electrical energy and the system further creates an approximation of cost based on the approximated consumption and actual price of the electrical energy. Based on such calculation the user is informed about the amount of energy needed and future costs.

The present invention is further directed to a method for monitoring the use of electronic and/or electric appliances comprising the following steps: measuring/monitoring power related parameters over a main electricity cable, said measuring/monitoring being performed by a measuring unit (2, 3, 5) part of an energy management system according to the present invention and preferably mounted at the entrance of a house or an apartment or a building, after the electricity meter. The method further comprises the step of processing said power related parameters on a first processing unit (6), by applying a signature detection algorithm for detecting whether an event relating to turning ON or OFF an electronic and/or electric appliance occurred and for characterizing said event, initiating a data transfer to a server (4), transferring to a server (4) a data packet comprising an output of said signature detection algorithm, characterized in that said method further comprises triggering the transfer of a data packet only in case such an event is detected. Because said data transfer is initiated when a signature is detected, the method according to the present invention is efficient and further characterized by an optimal usage of the in situ processing unit (1), server (4), and of the communication link over which said data transfer is initiated. It further assures that an accurate analysis is performed since the risk of such a communication link to be perturbed or not functional is minimized. Preferably, the in situ processing unit (1) performs at least the following steps:

(A) Measuring and monitoring power related set of parameters, X, as a function of time, t, over a main electricity cable through a measuring unit (2, 3, 5):

(B) Processing said power related parameters by applying a signature detection algorithm on a processing unit, by: (a) calculating a power value, $P_i$, from the values of the power related set of parameters, $X_i$, measured within a time interval, $\Delta t_i$ comprised between $[t_i, t_{i+1}]$; (b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}]$, wherein $t_j > t_i$; (c) comparing the value of the power variation, $\Delta P_i$, with a reference value, $\Delta P_{ref}$, and defining that an event occurred between times ti and $t_{j+1}$ in case $\Delta P_i > \Delta P_{ref}$, else the power set of parameters, $X_i$, is considered as steady between times ti and $t_{j+1}$. If and only if an event occurred between $t_i$ and $t_{j+1}$, then said processing unit further processes the data as follows: (d) defining an event interval $[t_{h,0}, t_{h,N+1}]$ with $t_{h,0} < t_i < t_{j+1} < t_{h,N+1}$, comprising a pre-event interval $\Delta t_{h,0} = [t_{h,0}, t_{h,1}]$ and post-event interval $\Delta t_{h,N} = [t_{h,N}, t_{h,N+1}]$, such that the power set of parameters, $X_{h,0}$ and $X_{h,N}$ are steady in both pre-event interval and post-event interval, respectively; (e) calculating the power values, $P_{h,0}$ and $P_{h,N}$ within the respective time intervals, $\Delta t_{h,0}$ and $\Delta t_{h,N}$, and calculating the variation $\Delta P_{h,ON} = P_{h,N} - P_{h,0}$;

(C) transferring a data packet comprising said variation, $\Delta P_{h,ON}$, to a server (4).

In a preferred embodiment according to the present invention said signature detection algorithm comprises: peak parameters and/or power parameters after peak. Such parameters are further sent to the server (4) for a further analysis.

In a preferred embodiment according to the present invention, said server (4) comprises a second processing unit (9) capable of performing the step of assigning a specific electronic and/or electric appliance to each data packet received from the in situ processing unit (1), as a function of various characteristic parameters of each of said data packets such as: $\Delta P_{h,ON}$, $P_{peak}$, $\Delta t_{peak}$. Such a function helps the user analyze the energy consumption over a period of time like over a day, or a week, or a month, or a number of months.

Preferably the output of said signature detection algorithm comprises a number string representing: peak parameters such as the amplitude of the peak, $P_{peak}$, $\Delta P_{h,ON}$, and/or duration of the peak, $\Delta t_{peak}$ and/or the output of the comparison (defined as the transient characteristic).

In another preferred embodiment according to the present invention, said second processing unit (9) further comprises a step of classifying different data packets having similar characteristic parameters into a duster and preferably a step of for sending said duster to said first processing unit (6) of the in situ processing unit (1).

The present invention is further directed towards a kit of parts comprising an in situ processing unit (1) as defined in the present paper and a server (4) as defined in the present paper.

In a further embodiment, said kit of parts comprises a in situ processing unit (1) comprising: a measuring unit comprising a sensor (2) suitable for measuring power parameters over a main electricity cable, said sensor (2) being adapted to be clamped around said electricity cable, a main board comprising a processor unit in communication with said sensor and capable of receiving data from said sensor (2), said main board further comprising a wireless interface (7) for communicating with said server (4), a controller unit for controlling the start and end transmission of processed power data over the wireless interface (7)

In another embodiment according to the present invention said kit of parts comprises a in situ processing unit (1) comprising: a sensor (2) suitable for measuring power parameters over a main electricity cable, said sensor (2) being adapted to be clamped around said electricity cable, a sensor (2) suitable for measuring power parameters on a second main electricity cable, said sensor (2) being adapted to be clamped around a power cable, a main board comprising a processor unit and a wireless interface (7), said main board receiving data from said sensors (2). In a preferred embodiment according to the present invention, said second main electricity cable is used for transporting energy from solar panels.

Example 1: Determining the Event Signature

A sensor (2) is clamped around the main electricity cable at the entrance of a house, after the electricity meter and before the fuse box. The electrical signal on said cable is characterized by a frequency of 50 Hz or 60 Hz.

The in situ processing unit (1) is measuring/monitoring the power characteristics such as the current and the voltage over said cable with a sampling rate of 4 kHz through said sensor (2) and a power cable (3). The samples are further processed by a 24 bits ADC (5) (Analog to Digital Converter) and the results are then sent to a first processing unit (6). Said first processing unit (6) further applies in real time a statistical T-test over two consecutive windows comprising samples from the ADC (5) as previously presented in the present paper. If the absolute value is above 35 the first processing unit (6) identifies that an event takes place and further records the peak duration ($\Delta t_{peak}$) and the minimum or maximum amplitude of the peak ($P_{peak}$), such as: if such an event defines a turn ON of an appliance, said processing unit stores the maximum amplitude of said peak, whereas if such an event defines a turn OFF of an appliance, said processing unit stores the minimum amplitude of said peak.

If an event is detected the values comprised in a 1 second window from before the peak are further processed by applying a FFT or an average function for determining the average power curve before such an event took place.

The same method for determining the average power curve after the event is applied to a 1 second window after the peak ended.

The difference between these two average power curves defines the center of the transient characteristic. Such a characteristic forms an 83 number string. The power curve is defined within one voltage period. Said voltage period is of 20 ms for a 50 Hz electrical signal and 16.6 ms for a 60 Hz electrical signal.

The transient characteristics together with the duration of the peak ($\Delta t_{peak}$) and the minimum/maximum amplitude of said peak ($P_{peak}$) define the event signature.

Example 2: Measuring/Monitoring Power Parameters Over a Single Phase Power Cable (FIG. 1)

A sensor (2) is clamped around a main electricity cable at the entrance of a house or apartment, after the electricity meter, before the fuse box. Such a sensor (2) is connected through a cable to a in situ processing unit (1). The in situ processing unit (1) is further connected to a conventional power source through a power cable (3), such as to a conventional power socket found within said house or apartment.

Preferably said in situ processing unit (1) receives data relating to the current through said sensor (2) and data relating to the voltage through the power cable (3).

The signal over said main electricity cable is characterized by a voltage between 210-230V and a frequency of 50 Hz.

The in situ processing unit (1) continuously measures/monitors the power parameters such as the current, voltage or cos φ over said an electricity cable, with a sampling rate selected between 3-5 kHz, through said sensor (2) and said power cable (3). The samples are further converted into digital data through the use of an ADC (5), part of said in situ processing unit (1). The result of the ADC (5) are further analyzed by the first processing unit (6), part of said in situ processing unit (1) by applying a mathematical function such as a two window technique or a sliding window technique in order to identify if an event such as turning ON/OFF an electronic and/or electric appliances within the house or apartment, as previously explained in the present paper. In case an electronic and/or electric appliance is turned ON within the house or apartment, the first processing unit (6) will identify a significant increase in energy consumption for a small period of time, followed by a decrease in energy consumption towards a steady zone.

In case an electronic and/or electric appliance is turned ON, the first processing unit (6) stores data relating to the peak such as maximum amplitude of the signal, and/or duration of peak. $\Delta t_{peak}$, (until the energy consumption reaches a steady characteristic), and/or power characteristics from before the peak and/or power characteristics from after the peak. The first processing unit (6) further performs a comparison between the power characteristics from after the peak and the power characteristics from before the peak and stores the result of such a comparison, said characteristic being known as the transient characteristic.

Preferably, such a comparison is performed over 2 windows of 1 second, one window selected immediately after the peak and the second window selected immediately before the peak. Each window comprises a voltage period which defines at 50 Hz 80 samples, with a period interval of 20 ms. The first processing unit (6) further creates an 83 number string comprising the result of the comparison and further creates a 120 number string comprising data concerning the peak characteristic (such as the maximum/minimum amplitude of the peak. $P_{peak}$, and/or the duration of the peak, $\Delta t_{peak}$), and the result of said comparison. Such a 120 number string defines the power signature of the appliance that was turned ON and since such an appliance will have a significantly similar peak characteristic and/or result of the comparison, a similar 120 number string will be created each time the same appliance is turned ON.

In case an electronic and/or electric appliance is turned OFF, the first processing unit (6) stores data relating to the power characteristics before the appliance is turned OFF when the energy consumption defines a relative steady characteristic and/or power characteristics after the appliance is turned OFF, when the energy consumption defines again a relative steady characteristic. The first processing unit (6) further performs a comparison between such power characteristics, known as the transient characteristic. The first processing unit (6) further creates a 83 number string comprising the result of the comparison If the system identifies a peak once said electric appliance is turned OFF, it will further store the minimum amplitude of said peak and/or duration of said peak, $\Delta t_{peak}$. The first processing unit (6) further performs a comparison between the power characteristics from after the peak and the power characteristics from before the peak and stores the result of such a comparison. The first processing unit (6) further creates a 120 number string comprising data concerning the peak characteristic (such as the minimum amplitude of the peak and/or the duration of the peak, $\Delta t_{peak}$), and the result of said comparison. Such a 120 number string defines the power signature of the appliance that was turned OFF and since such a appliance will have a significantly similar peak characteristic and/or result of the comparison, a similar 120 number string will be created each time the same appliance is turned OFF.

Further, the in situ processing unit (1) sends the number strings as they are created to a server (4) at a remote location. Such a communication is done through a wireless interface (7).

The server (4) further analyses the received strings by classifying them into clusters according to similar shape of the waveforms, and/or similar magnitude of the average power, and/or similar transient time, and/or minimum/maximum amplitude of the peak ($P_{peak}$), and/or combinations thereof. For a faster identification of an electronic and/or electric appliance when such appliance will be turned ON again, the clusters are further sent by the server (4) to the in situ processing unit (1) and stored thereon. In a further step, when the in situ processing unit (1) identifies that an electronic and/or electric appliance is turned ON, it will first compare the created number string with the stored clusters and in case of a positive match, it will send said number string together with the identified cluster to the server (4) for further analysis. In case the comparison does not provide a match, the in situ processing unit (1) will send only the number string to the server (4).

Preferably, the in situ processing unit (1) is left to measure/monitor the power parameters over a main electricity cable for a week or even ten days. During this period, the server (4) will store details regarding the electronic and/or electric appliances that have been turned ON/OFF such as: energy consumption of each appliance and moment of time when it was turned ON and/or OFF.

Preferably a user accesses such data and identifies the individual electronic and/or electric appliances based on the stored details. Once such appliances are named, the server (4) will automatically recognize them the next time they will be turned ON/OFF.

The user can further retrieve statistical graphs regarding the energy consumption over a week, or a month, or a number of months. Such graphs can further provide information regarding a change in energy consumption characteristic regarding a particular appliance compared with a previous characteristic, indicating a possible malfunction or even a break-down of such an appliance in the near future.

Due to such an analysis, the user can further adjust the time interval in which certain appliances function or even realize when electronic and/or electric appliances are functioning without any particular need and as a result reduce considerably the energy consumption and costs.

Example 3: Measuring/Monitoring Power Parameters Over a Single Phase Power Cable (FIG. 1)

A sensor (2) is clamped around a main electricity cable at the entrance of a house or apartment, after the electricity meter and before the fuse box. Such a sensor (2) is connected through a cable to a in situ processing unit (1). The in situ processing unit (1) is further connected to a conventional power source through a power cable (3), such as to a conventional power socket found within said house or apartment.

The signal over said main electricity cable is characterized by a voltage between 110-130V and a frequency of 60 Hz.

The in situ processing unit (1) continuously measures/monitors the power parameters such as the current, voltage or cos φ over said an electricity cable, with a sampling rate selected between 3-5 kHz, through said sensor (2) and the power cable (3). The samples are further converted into digital data through the use of an ADC (5), part of the in situ processing unit (1). The result of the ADC (5) are further analyzed by the first processing unit (6), part of said in situ processing unit (1) by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Figure 2:
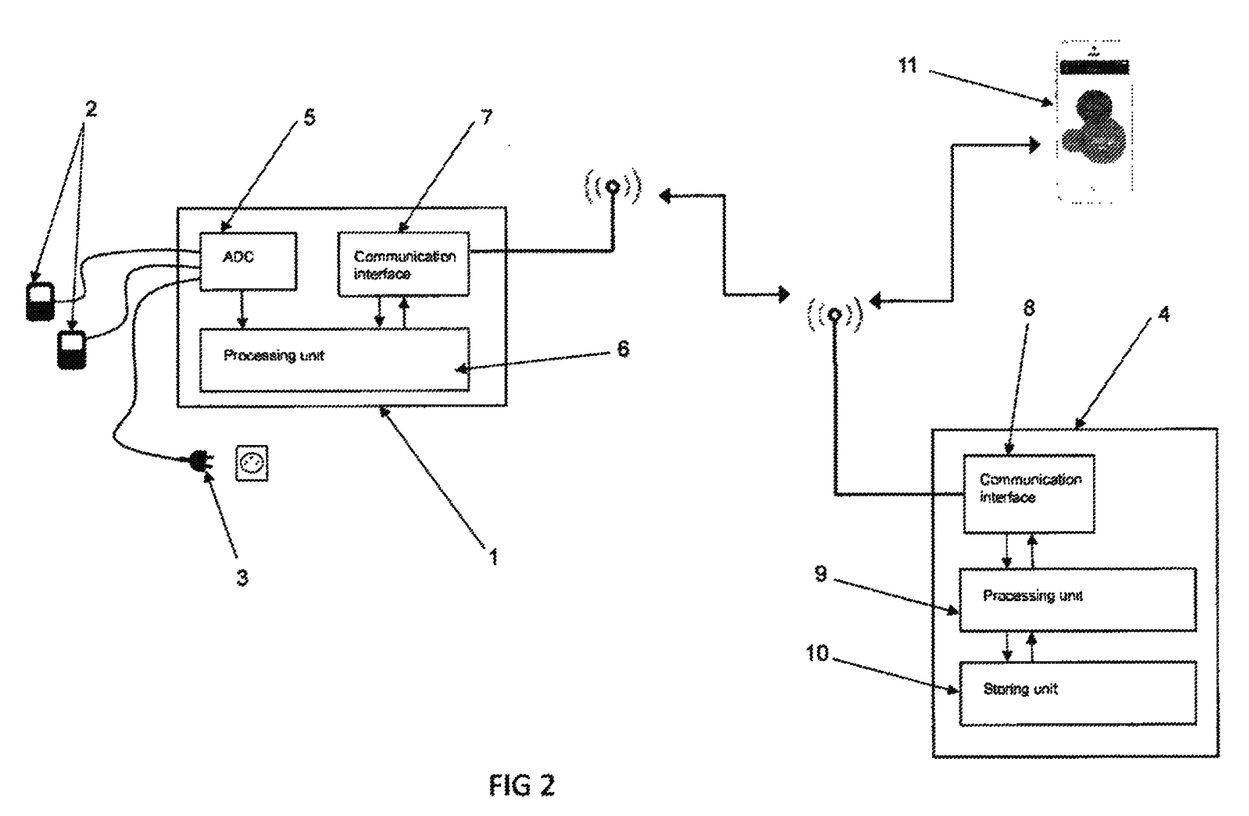
FIG. 2 schematically represents a dual phase system according to the present invention

Example 4: Measuring/Monitoring Cower Parameters Over a Dual Phase Power Cable (FIG. 2)

A first sensor (2) is clamped around a first phase of the main electricity cable at the entrance of a house or apartment, after the electricity meter and before the fuse box. A second sensor (2) is clamped around a second phase of said main electricity cable at the entrance of a house or apartment, after the electricity meter and before the fuse box. Each sensor (2) is connected through a cable to a in situ processing unit (1). The in situ processing unit (1) is further connected to a conventional power source through a power cable (3), such as to a conventional power socket found within said house or apartment.

The signal over said main electricity cable is characterized by a voltage between 110-130V and a frequency of 60 Hz.

The in situ processing unit (1) continuously measures/monitors the power parameters such as the current, voltage or cos φ over said an electricity cable, with a sampling rate selected between 3-5 kHz, through the sensors (2) and the power cable (3). The samples are further converted into digital data through the use of an ADC (5), part of the in situ processing unit (1). The result of the ADC (5) are further analyzed by the first processing unit (6), part of said in situ processing unit (1), by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Example 5: Measuring/Monitoring Power Parameters Over a Single Phase Power Cable and Over a Power Cable Transporting Energy from Solar Panels (FIG. 2)

A sensor (2) is clamped around a main electricity cable at the entrance of a house or apartment, after the electricity meter and before the fuse bix. Such a sensor (2) is connected through a cable to a in situ processing unit (1). The in situ processing unit (1) is further connected to a conventional power source through a power cable, such as to a conventional power socket found within said house or apartment.

A second sensor (2) is clamped around the electricity cable transporting electricity from solar panels, after the electricity meter and before the fuse box. Such a sensor (2) is connected through a cable to said in situ processing unit (1).

The in situ processing unit (1) continuously measure/monitor the power parameters such as the current, voltage or cos φ over both electricity cables, with a sampling rate selected between 3-5 kHz, through the sensors (2) and the power cable (3). The samples are further converted into digital data through the use of an ADC (5), part of the in situ processing unit (1). The result of the ADC (5) are further analyzed by the first processing unit (6), part of said in situ processing unit (1), by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Such an analysis provides an accurate and complete analysis of energy consumption within a house or apartment in case the electricity from solar panels are used in parallel with electricity coming from conventional source such as a power plant.

Example 6: Measuring/Monitoring Dower Parameters Over a Dual Phase Power Cable and Over a Power Cable Transporting Energy from Solar Panels A first sensor (2) is clamped around a first phase of the main electricity cable at the entrance of a house or apartment, after the electricity meter and before the fuse box.

A second sensor (2) is clamped around a second phase of said main electricity cable at the entrance of a house or apartment, after the electricity meter and before the fuse box. Each sensor (2) is connected through a cable to a in situ processing unit (1). The in situ processing unit (1) is further connected to a conventional power source through a power cable (3), such as to a conventional power socket found within said house or apartment.

A third sensor (2) is clamped around the electricity cable transporting electricity from solar panels, after the electricity meter and before the fuse box. Such a sensor (2) is connected through a cable to said in situ processing unit (1).

The in situ processing unit (1) continuously measure/monitor the power parameters such as the current, voltage or cos φ over both electricity cables, with a sampling rate selected between 3-5 kHz, through sensors (2) and power cable (3). The samples are further converted into digital data through the use of an ADC (5), part of the in situ processing unit (1). The result of the ADC (5) are further analyzed by the first processing unit (6), part of said in situ processing unit (1), by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Such an analysis provides an accurate and complete analysis of energy consumption within a house or apartment in case the electricity from solar panels are used in parallel with electricity coming from conventional source such as a power plant.

Example 7: Measuring/Monitoring Power Parameters Over a Three Phase Power Cable and Over a Power Cable Transporting Energy from Solar Panels A first sensor (2) is clamped around a first phase of the main electricity cable at the entrance of a house or apartment, after the electricity meter and before the fuse box. A second sensor (2) is clamped around a second phase of said main electricity cable at the entrance of a house or apartment, after the electricity meter and before the fuse box. A third sensor (2) is clamped around a third phase of said main electricity cable at the entrance of a house or apartment, after the electricity meter, before the fuse box. Each sensor (2) is connected through a cable to a in situ processing unit (1). The in situ processing unit (1) is further connected to a conventional power source through a power cable (3), such as to a conventional power socket found within said house or apartment.

A forth sensor (2) is clamped around the electricity cable transporting electricity from solar panels, after the electricity meter, before the fuse box. Such a sensor (2) is connected through a cable to said in situ processing unit (1).

The in situ processing unit (1) continuously measure/monitor the power parameters such as the current, voltage or cos φ over both electricity cables, with a sampling rate selected between 3-5 kHz, though the sensors (2) and power cable (3). The samples are further converted into digital data through the use of an ADC (5), part of the in situ processing unit (1). The result of the ADC (5) are further analyzed by the first processing unit (6), part of the in situ processing unit (1), by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Such an analysis provides an accurate and complete analysis of energy consumption within a house or apartment in case the electricity from solar panels are used in parallel with electricity coming from conventional source such as a power plant.

Example 8: Measuring/Monitoring Power Parameters Over a Three Phase Power Cable and Over a Three Phase Power Cable Transporting Energy from Solar Panels A first sensor (2) is clamped around a first phase of the main electricity cable at the entrance of a house or apartment, after the electricity meter and before the fuse box.

A second sensor (2) is clamped around a second phase of said main electricity cable at the entrance of a house or apartment, after the electricity meter, before the fuse box.

A third sensor (2) is clamped around a third phase of said main electricity cable at the entrance of a house or apartment, after the electricity meter, before the fuse box. Each sensor (2) is connected through a cable to a in situ processing unit (1). The in situ processing unit (1) is further connected to a conventional power source through a power cable (3), such as to a conventional power socket found within said house or apartment.

A forth sensor (2) is clamped around a first phase of the electricity cable transporting electricity from solar panels, after the electricity meter, before the fuse box. A fifth (2) sensor (2) is claimed around a second phase of the electricity cable transporting electricity from solar panels, after the electricity meter, before the fuse box. A sixth sensor (2) is claimed around a third phase of the electricity cable transporting electricity from solar panels, after the electricity meter, before the fuse box. Each sensor (2) is connected through a cable to said in situ processing unit (1).

The in situ processing unit (1) continuously measure/monitor the power parameters such as the current, voltage or cos φ over both electricity cables, with a sampling rate selected between 3-5 kHz, through sensors (2) and power cable (3). The samples are further converted into digital data through the use of an ADC (5), part of the in situ processing unit (1). The result of the ADC (5) are further analyzed by the first processing unit (6), part of said in situ processing unit (1), by applying a mathematical function such as a two window technique or a sliding window technique in order to identify if an event such as turning ON/OFF an electronic and/or electric appliance within the house or apartment.

The power data are further analyzed in substantially the same manner as presented in example 2.

Such an analysis provides an accurate and complete analysis of energy consumption within a house or apartment in case the electricity from solar panels are used in parallel with electricity coming from conventional source such as a power plant.

The following table lists the reference numbers and abbreviations used in figures and in the text:

| Reference | Description |
|---|---|
| 1 | In situ processing unit |
| 2 | Sensor |
| 3 | Plug |
| 4 | Server |
| 5 | Analog to Digital Convertor |
| 6 | Processing unit |
| 7 | Communication interface |
| 8 | Communication interface |
| 9 | Processing unit |
| 10 | Storing unit |
| X | Power related set of parameters |
| $P_{i,j}$ | Power values at time interval $\Delta t_j = [t_j, t_{j+1}]$, and at time interval $\Delta t_i = [t_i, t_{i+1}]$ respectively |
| $\Delta P_i$ | Power variation |
| $\Delta t_{h,0}$ | Pre-event interval |
| $\Delta t_{h,N}$ | Post-event interval |
| $P_{h,0}$ | Power value within $\Delta t_{h,0}$ |
| $P_{h,N}$ | Power value within $\Delta t_{h,N}$ |
| $\Delta P_{h,0N}$ | Power variation $\Delta P_{h,0N} = P_{h,N} - P_{h,0}$ |
| $P_{peak}$ | The amplitude of the peak |
| $\Delta t_{peak}$ | The duration of the peak |
| $T(\Delta t_i, \Delta t_j)$ | T test |

The invention claimed is:

1. The energy management system comprising an in situ processing unit comprising:
    (a) a measuring unit capable of measuring a set of power related parameters over a main electricity cable;
    (b) a first processing unit capable of processing said power related parameters by applying a signature detection algorithm, for detecting an event relating to turning ON or OFF of an electronic and/or electric appliance and for characterizing said event;
    (c) a device for transferring to a server a data packet comprising an output of said signature detection algorithm;
    wherein the processing unit triggers the transfer of at least one data packet only in case such an event is detected and
    wherein the in situ processing unit comprises:
    the measuring unit capable of measuring and monitoring a power related set of parameters, X, as a function of time, t, over a main electricity cable;
    the first processing unit capable of processing said power related parameters by applying a signature detection algorithm comprising:
        (a) calculating a power value, $P_i$, from the values of the power related set of parameters, $X_i$, measured within a time interval, $\Delta t_i$ comprised between $[t_i, t_{i+1}]$;
        (b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}]$, wherein $t_j > t_i$;
        (c) comparing the value of the power variation, $\Delta P_i$, with a reference value, $\Delta P_{ref}$, and defining that an event occurred between times $t_i$ and $t_{j+1}$ in case $\Delta P_i > \Delta P_{ref}$, else the power set of parameters, $X_i$, is considered as steady between times $t_i$ and $t_{j+i}$;

if and only if an event occurred between $t_i$ and $t_{i+i}$, then said processing unit further processes the data as follows:

(d) defining an event interval $[t_{h,0}, t_{h,N+1}]$ with $t_{h,0} < t_i < t_{j+1}$, comprising a pre-event interval $\Delta t_{h,0} = [t_{h,0}, t_{h,1}]$ and post-event interval $\Delta t_{h,N} = [t_{h,N}, t_{h,N+1}]$, such that the power set of parameters, $X_{h,0}$ and $X_{h,N}$ are steady in both pre-event interval and post-event interval, respectively;

(e) calculating the power values, $P_{h,0}$ and $P_{h,N}$ within the respective time intervals, $\Delta t_{h,0}$ and $\Delta t_{h,N}$, and calculating the variation $\Delta P_{h,ON} = P_{h,N} - P_{h,0}$;

a device for transferring at least one data packet comprising said variation, $\Delta P_{h,ON}$, to the server.

2. The energy management system according to claim 1, wherein the power related set of parameters, X comprises data selected from any one or more of: voltage, U, current, I, U, I phase difference, cos φ.

3. The energy management system according to claim 2, wherein the power values $P_i$, $P_j$ are in the form of an n-dimensional vector, where the n values in the vector model increase the power curve during one complete voltage cycle.

4. The energy management system according to claim 3, wherein the value of the power variation $\Delta P_i = P_j - P_i$ for defining whether an event occurred between times $t_i$ and $t_{j+1}$ is determined by a T test, $T(\Delta t_i, \Delta t_j)$, defined as the difference between the arithmetic means, $\overline{P_{\Delta t_i}}, \overline{P_{\Delta t_j}}$, of power values measured at different times in the intervals $\Delta t_i$ and $\Delta t_j$, respectively, divided by the square root of the sum of the variances of said power values, divided by the total number, n, of power values measured in both intervals $\Delta t_i$ and $\Delta t_j$:

$$T(\Delta t_i, \Delta t_j) = \frac{\overline{P_{\Delta t_i}} - \overline{P_{\Delta t_j}}}{\sqrt{\frac{\sigma^2_{\Delta t_i} + \sigma^2_{\Delta t_j}}{n}}}.$$

5. The energy management system according to claim 4, wherein the time intervals $\Delta t_i$ and $\Delta t_j$ are consecutive, i.e., $t_{i+1} = t_j$.

6. The energy management system according to claim 5, wherein the event interval $[t_{h,0}, t_{h,N+1}]$ is divided into N+2 consecutive event subintervals: $\Delta t_{h,0}, \Delta t_{h,1}, \ldots, \Delta t_{h,i+1}, \ldots, \Delta t_{h,N}, \Delta t_{h,N+1}$, of equal time duration.

7. The energy management system according to claim 6, wherein the output of said signature detection algorithm comprises a number string representing peak parameters such as: the amplitude of the peak, $P_{peak}$, $\Delta P_{h,ON}$, duration of the peak, $\Delta t_{peak}$, and/or the output of the comparison, defined as the transient characteristic.

8. The energy management system according to claim 7, wherein the system comprises the server, said server comprising a communication interface for receiving the at least one data packet transferred by the in situ processing unit.

9. The energy management system according to claim 8 wherein the server further comprises a second processing unit capable of assigning a specific electronic and/or electric appliance to each of the at least one data packet received from the in situ processing unit as a function of various characteristic parameters of each of said data packets such as: $\Delta P_{h,ON}$, $P_{peak}$, $\Delta t_{peak}$.

10. The energy management system according to claim 9 wherein said second processing unit further comprises a device for classifying different data packets having similar characteristic parameters into a cluster and preferably a device for sending said cluster to said first processing unit of the in situ processing unit.

11. The energy management system according to claim 10, wherein said power related set of parameters, X, are measured/monitored at a sampling rate comprised between 1-16 kHz.

12. The energy management system according to claim 11, wherein said server further performs an analysis of energy consumption over time.

13. A method for monitoring electronic and/or electric appliances comprising the following steps:

measuring/monitoring power related parameters over a main electricity cable, using a measuring part of an in situ processing unit; said processing unit being part of an energy management system;

said energy management system further comprising a device for transferring to a server a data packet comprising an output of said signature detection algorithm;

processing said power related parameters on said in situ processing unit, by applying a signature detection algorithm for detecting whether an event relating to turning ON or OFF an electronic and/or electric appliance occurred and for characterizing said event initiating a data transfer to the server transferring to the server at least one data packet comprising an output of said signature detection algorithm said method further comprises triggering the transfer of at least one data packet only in case such an event is detected and wherein the in situ processing unit performs at least the following steps: measuring and monitoring a power related set of parameters, X, as a function of time, t, over a main electricity cable through a measuring unit;

processing said power related parameters by applying the signature detection algorithm on the processing unit, by at least:

(a) calculating a power value, $P_i$, from the values of the power related set of parameters, $X_i$, measured within a time interval, $\Delta t_i$ comprised between $[t_i, t_{i+1}]$;

(b) calculating a power variation, $\Delta P_i = P_j - P_i$, between the power value, $P_j$, at time interval $\Delta t_j = [t_j, t_{j+1}]$, and the power value $P_i$ at time interval $\Delta t_i = [t_i, t_{i+1}]$, wherein $t_j > t_i$;

(c) comparing the value of the power variation, $\Delta P_i$, with a reference value, $\Delta P_{ref}$, and defining that an event occurred between times $t_i$ and $t_{j+1}$ in case $\Delta P_i > \Delta P_{ref}$, else the power set of parameters, $X_i$, is considered as steady between times $t_i$ and $t_{j+1}$;

if and only if an event occurred between $t_i$ and $t_{j+1}$, then said processing unit further processes the data as follows:

(d) defining an event interval $[t_{h,0}, t_{h,N+1}]$ with $t_{h,0} < t_i < t_{j+1} < t_{h,N+1}$, comprising a pre-event interval $\Delta t_{h,0} = [t_{h,0}, t_{h,1}]$ and post-event interval $\Delta t_{h,N} = [t_{h,N}, t_{h,N+1}]$, such that the power set of parameters, $X_{h,0}$ and $X_{h,N}$ are steady in both pre-event interval and post-event interval, respectively;

(e) calculating the power values, $P_{h,0}$ and $P_{h,N}$ within the respective time intervals, $\Delta t_{h,0}$ and $\Delta t_{h,N}$, and calculating the variation $\Delta P_{h,ON} = P_{h,N} - P_{h,0}$; transferring at least one data packet comprising said variation, $\Delta P_{h,ON}$, to the server.

14. The method according to claim 13, wherein said server comprises the second processing unit capable of performing the step of assigning a specific electronic and/or electric appliance to each of the at least one data packet received from the in situ processing unit, as a function of various characteristic parameters of each of said data packets such as: $\Delta P_{h,ON}$, $P_{peak}$, $\Delta t_{peak}$.

15. The method according to claim 14 wherein the output of said signature detection algorithm comprises a number string representing: peak parameters such as the amplitude of the peak, $P_{peak}$, $\Delta P_{h,ON}$, and/or duration of the peak, $\Delta t_{peak}$, and/or the output of the comparison, defined as the transient characteristic.

16. The method according to claim 14, wherein said second processing unit further comprises a step of classifying different data packets having similar characteristic parameters into a cluster and preferably a step of sending said cluster to said first processing unit of the in situ processing unit.

17. The energy management system of claim 12 further comprising a kit of parts, said kit of parts comprising:
an in situ processing unit comprising:
(a) a measuring unit capable of measuring a set of power related parameters over a main electricity cable;
(b) a first processing unit capable of processing said power related parameters by applying a signature detection algorithm, for detecting an event relating to turning ON or OFF of an electronic and/or electric appliance and for characterizing said event;
(c) a device for transferring to a server a data packet comprising an output of said signature detection algorithm;

wherein the processing unit triggers the transfer of at least one data packet only in case such an event is detected.

18. The energy management system of claim 17 having the kit of parts wherein the in situ processing unit comprises:
a measuring unit comprising a sensor suitable for measuring power parameters over a main electricity cable, said sensor being adapted to be clamped around said electricity cable;
a main board comprising a processor unit, in communication with said sensor and capable of receiving data from said sensor, said main board further comprising a wireless interface for communicating with said server,
a controller unit for controlling the start and end transmission of processed power data over the wireless interface.

19. The energy management system of claim 18 having the kit of parts wherein the in situ processing unit comprises:
a sensor suitable for measuring power parameters over a main electricity cable, said sensor being adapted to be clamped around said electricity cable
a sensor suitable for measuring power parameters on a second main electricity cable, said sensor being adapted to be clamped around a power cable
a main board comprising a processor unit and a wireless interface, said main board receiving data from said sensors.

* * * * *